(12) United States Patent
Dong

(10) Patent No.: US 11,514,719 B1
(45) Date of Patent: Nov. 29, 2022

(54) SYSTEMS AND METHODS FOR HIERARCHICAL FACIAL IMAGE CLUSTERING

(71) Applicant: Fortinet, Inc., Sunnyvale, CA (US)

(72) Inventor: Xihua Dong, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 14 days.

(21) Appl. No.: 17/323,876

(22) Filed: May 18, 2021

(51) Int. Cl.
*G06V 40/16* (2022.01)
*G06V 10/75* (2022.01)
*G06V 20/52* (2022.01)

(52) U.S. Cl.
CPC .......... *G06V 40/172* (2022.01); *G06V 10/751* (2022.01); *G06V 20/52* (2022.01); *G06V 40/171* (2022.01)

(58) Field of Classification Search
None
See application file for complete search history.

(56) References Cited

U.S. PATENT DOCUMENTS

| 8,780,197 | B2 * | 7/2014 | Park | G06V 40/161 |
| | | | | 348/139 |
| 2019/0370530 | A1 * | 12/2019 | Lin | G06V 10/764 |
| 2020/0175261 | A1 * | 6/2020 | Shimizu | G06F 21/32 |

FOREIGN PATENT DOCUMENTS

WO WO-2019105163 A1 * 6/2019 ......... G06F 16/5838

OTHER PUBLICATIONS

U.S. Appl. No. 17/135,887, filed Dec. 28, 2020, Dong.
U.S. Appl. No. 17/135,867, filed Dec. 28, 2020, Dong.

* cited by examiner

*Primary Examiner* — Delomia L Gilliard
(74) *Attorney, Agent, or Firm* — HDC Intellectual Property Law, LLP

(57) ABSTRACT

Various systems and methods for for clustering facial images in, for example, surveillance systems.

21 Claims, 7 Drawing Sheets

SYSTEMS AND METHODS FOR HIERARCHICAL FACIAL IMAGE CLUSTERING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

BACKGROUND

Field

Embodiments of the present disclosure generally relate to facial recognition. In particular, embodiments of the present disclosure relate to systems and methods for clustering facial images in, for example, surveillance systems.

Description of the Related Art

Facial recognition systems, also referred to as face recognition systems, provide the capability to computing devices to match a human face captured in an image or video feed against a database of faces. In face recognition (FR) systems, facial features are used to perform matching operations to differentiate one person from others. Advanced machine learning models, such as Deep Neural Networks (DNNs), may be used to compute the facial features. For example, FaceNet, one of the widely used DNNs, extracts features from an image and outputs a 512×1 feature vector. This feature vector is referred to as an "embedding" as the information of interest from the processed image is embedded within the feature vector.

SUMMARY

Various embodiments provide systems and methods for for clustering facial images in, for example, surveillance systems.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1A:
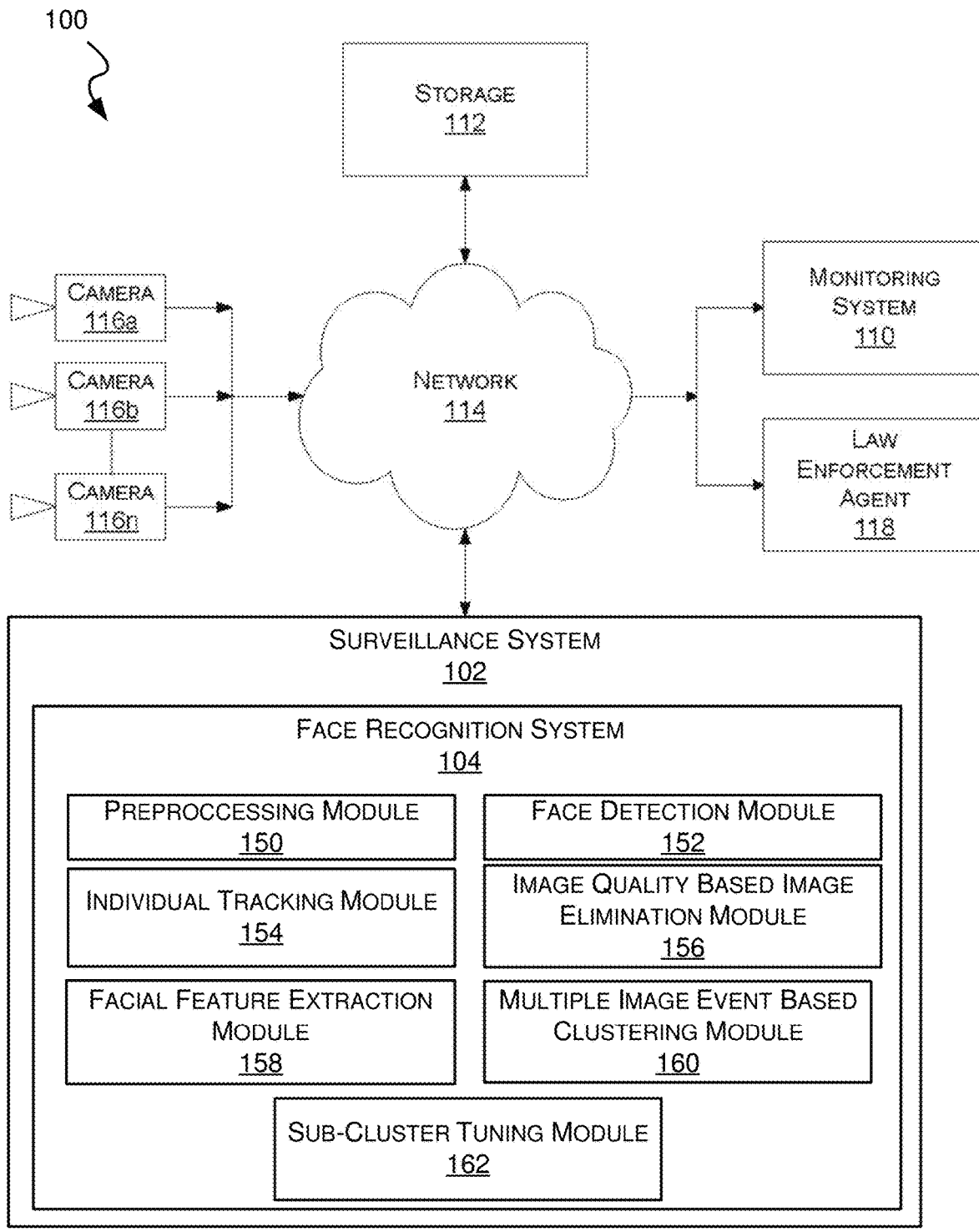
FIG. 1A illustrates an example network environment in which a face recognition system is deployed in accordance with some embodiments.

Various embodiments provide systems and methods for grouping image clusters captured during an event with other image clusters.

Various embodiments provide systems and methods for capturing and grouping images of individuals for use in, for example, any system relying on facial recognition. In some embodiments, a series of two or more images captured during a single event are grouped into an image event. Such an image event is then compared on a group basis with previously captured groups of images to determine whether the similarities are sufficient to justify combining the newly captured image event into a cluster of similar groups of images. In some embodiments, non-image based analysis may be applied to combine respective clusters of similar groups of images. Such non-image based analysis may include, but is not limited to, a human input indicating that two different clusters include images of the same individual or some other input.

In some embodiments, a hierarchical style approach is used that consists of three processes: 1) face tracking in video to build events, 2) event clustering with sequence distance metric, and 3) fine-tuning. With the limited aid of human interference, satisfactory clustering results, which achieves both "purity" and "completeness". In some cases, such approaches also deliver robust results in the wild, especially in surveillance systems, where severe conditions (e.g., low illumination, large variation of head pose and motion blur) may dramatically affect the performance of traditional single-state clustering algorithms.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/ machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "surveillance system" or a "video surveillance system" generally refers to a system including one or more video cameras coupled to a network. The audio and/or video captured by the video cameras may be live monitored and/or transmitted to a central location for recording, storage, and/or analysis. In some embodiments, a network security appliance may perform video analytics on video captured by a surveillance system and may be considered to be part of the surveillance system.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Various embodiments provide facial recognition systems that include a processing resource and a non-transitory computer-readable medium. The non-transitory computer readable medium has stored therein instructions that when executed by the processing resource cause the processing resource to: receive a series of scene images; assemble a first image event including at least a first face image from a first scene image of the series of scene images and a second face image from a second scene image of the series of scene images; and perform facial feature extraction on at least the first face image to yield a first facial feature, and on the second face image to yield a second facial feature. In addition, the instructions that when executed by the processing resource cause the processing resource to: calculate a distance between the first facial feature and a third facial feature corresponding to a third face image in a second image; calculate a second distance between the first facial feature and a fourth facial feature corresponding to a fourth face image in the second image event; calculate a third distance between the second facial feature and the third facial feature corresponding to the third face image in the second image event; and calculate a fourth distance between the second facial feature and the fourth facial feature corresponding to the fourth face image in the second image event. In addition, the instructions that when executed by the processing resource cause the processing resource to: determine a composite distance between the first image event and the second image event based at least in part on a combination of the first distance, the second distance, the third distance, and the fourth distance; and group the first image event with the second image event based at least in part on the composite distance.

Other embodiments provide non-transitory computer-readable storage media embodying a set of instructions, which when executed by one or more processing resources of a computer system, causes the one or more processing resources to: receive a series of scene images, where the series of scene images includes at least a first scene image taken at a location at a first time and a second scene image taken at the location at a second time; assemble a first image event including at least a first face image from the first scene image and a second face image from the second scene image; perform facial feature extraction on at least the first face image to yield a first facial feature, and on the second face image to yield a second facial feature; calculate: a first distance between the first facial feature and a third facial feature corresponding to a third face image in a second image event, a second distance between the first facial feature and a fourth facial feature corresponding to a fourth face image in the second image event, a third distance between the second facial feature and the third facial feature corresponding to the third face image in the second image event, and a fourth distance between the second facial feature and the fourth facial feature corresponding to the fourth face image in the second image event; determine a composite distance between the first image event and the second image event based at least in part on a combination of the first distance, the second distance, the third distance, and the fourth distance; and group the first image event with the second image event based at least in part on the composite distance.

Yet other embodiments provide methods for grouping images, the methods include: receiving, by a processing resource, a series of scene images, where the series of scene images includes at least a first scene image taken at a location at a first time and a second scene image taken at the location at a second time; assembling, by the processing resource, a first image event including at least a first face image from the first scene image and a second face image from the second scene image; and performing, by the processing resource, facial feature extraction on at least the first face image to yield a first facial feature, and on the second face image to yield a second facial feature. The methods further include: calculating, by the processing resource: a first distance between the first facial feature and a third facial feature corresponding to a third face image in a second image event; a second distance between the first facial feature and a fourth facial feature corresponding to a fourth face image in the second image event; a third distance between the second facial feature and the third facial feature corresponding to the third face image in the second image event; and a fourth distance between the second facial feature and the fourth facial feature corresponding to the fourth face image in the second image event. A composite distance between the first image event and the second image event is determined based at least in part on a combination of the first distance, the second distance, the third distance, and the fourth distance; and the first image event is grouped with the second image event based at least in part on the composite distance.

In some instances of the aforementioned embodiments, determining the composite distance between the first image event and the second image event based at least in part on the combination of the first distance, the second distance, the third distance, and the fourth distance includes calculating, by the processing resource, an average distance between the first image event and the second image event to yield the composite distance. In various instances of the aforementioned embodiments, determining the composite distance between the first image event and the second image event based at least in part on the combination of the first distance, the second distance, the third distance, and the fourth distance includes identifying, by the processing resource, a minimum distance between the first image event and the second image event to yield the composite distance, wherein the minimum distance is one of the first distance, the second distance, the third distance, or the fourth distance.

In one or more instances of the aforementioned embodiments, the series of scene images further includes a third scene image taken at the location at a third time, and assembling the first image event further includes including a third face image from the third scene image into the first image event. In such instances, the methods may further include: determining, by the processing device, a first quality score for the first face image; determining, by the processing device, a second quality score for the second face image; determining, by the processing device, a third quality score for the third face image, where the third quality score indicates the third face image is of lower quality than either the first face image or the second face image; and eliminating the third face image from the first image event based at least in part on the third quality score. In some such instances, eliminating the third face image from the first image event based at least in part on the third quality score includes comparing, by the processing resource, the third quality score with a threshold value, wherein the third quality score is less than the threshold value.

In some instances of the aforementioned embodiments where the series of scene images is a video, the methods may further include: segregating, by the processing resource, the video into a series of video frames, wherein the first scene image is a first frame of the series of video frames, and wherein the second scene image is a second frame of the series of video frames. In some such instances, the video is received from a video camera that is incorporated in a surveillance system. In one or more instances of the aforementioned embodiments, the processing resource is incorporated in a surveillance system. In various instances of the aforementioned embodiments, the first face image and the second face image are of the same individual. In some such instances, the first face image and the third face image are of the same individual.

In various instances of the aforementioned embodiment where the composite distance is a first composite distance, the methods further include: assembling, by the processing resource, a third image event including at least a fifth face image from the first scene image and a sixth face image from the second scene image, where the first face image and the second face image are of a first individual; and where the fifth face image and the sixth face image are of a second individual; performing, by the processing resource, facial feature extraction on at least the fifth face image to yield a fifth facial feature, and on the sixth face image to yield a sixth facial feature; calculating, by the processing resource: a fifth distance between the fifth facial feature and the third facial feature corresponding to a third face image in the second image event; a sixth distance between the fifth facial feature and the fourth facial feature corresponding to the fourth face image in the second image event; a seventh distance between the sixth facial feature and the third facial feature corresponding to the third face image in the second image event; an eighth distance between the sixth facial feature and the fourth facial feature corresponding to the fourth face image in the second image event; and determining, by the processing resource, a second composite distance between the third image event and the second image event based at least in part on a combination of the fifth distance, the sixth distance, the seventh distance, and the eighth distance.

Turning to FIG. 1A, an example network environment 100 is shown in which a face recognition system 104 is deployed in accordance with some embodiments. In the context of the present example, face recognition system 104 is deployed as part of a surveillance system 102. While this embodiment discusses face recognition system 104 as part of a surveillance system, one of ordinary skill in the art will recognize a variety of other systems or devices in which or with face recognition system 104 may be deployed. For example, face recognition system 104 may be incorporated in a physical security control system or another facial recognition-based authentication system.

Surveillance system 102 receives video feeds (also referred to as video frames) from one or more cameras (e.g., cameras 116a-n) installed at different locations. The cameras 116a-n may deliver high-resolution video frames (e.g., 1280×720, 1920×1080, 2560×1440, 2048×1536, 3840× 2160, 4520×2540, 4096×3072 pixels, etc.) via a network 114 with high frame rates. The video frames captured from the cameras 116a-n may be input into the face recognition system 104. Different entities, such as camera 116a-n, surveillance system 102, and monitoring system 110, devices of law enforcement agent 118, storage 112 may be on different computing devices connected through network 114, which may be a LAN, WAN, MAN, or the Internet. Network 114 may include one or more wired and wireless networks and/or connection of networks. The video feeds received from each of these cameras may be analyzed to recognize human faces.

According to one embodiment, face recognition system 104 analyzes the video feeds or images to recognize human faces using a machine learning model. Face recognition system 104 may be designed using a Deep Neural Network (DNN) machine learning model to recognize human faces in the video feeds or an image. In the context of the present example, face recognition system 104 includes: a preprocessing module 150, a face detection module 152, an individual tracking module 154, an image quality prediction module 156, a facial feature extraction module 158, a multiple image event based clustering module 160, and a sub-cluster tuning module 162.

Preprocessing module 150 is configured to receive a video input (or a series of still images) from, for example, one of cameras 116, and to extract image frames from the video input. In addition, preprocessing module 150 is configured to apply one or more image processing operations to the extracted frame (or received still image) to enhance the image for facial recognition. Such image processing operations may include, but are not limited to, whitening, scaling, and/or de-blurring as are known in the art. Based upon the disclosure provided herein, one of ordinary skill in the art will recognize a variety of image processing operations that may be applied. The resulting processed image is provided to face detection module 152.

Face detection module 152 is configured to apply one or more face recognition algorithms to the scene within the image received from preprocessing module 150. Application of the face recognition algorithm(s) yields one or more face images derived from the received image. Such face recognition algorithms may include, but are not limited to, Multi-Task Cascaded Convolutional Neural Networks (MTCNN) and/or TinaFace as are known in the art. Based upon the disclosure provided herein, one of ordinary skill in the art will recognize a variety of face recognition algorithms that may be applied yield the face image(s).

Individual tracking module 154 tracks individuals across the frames of video in which face images are detected. As face images are detected by face detection module 152, individual tracking module 154 groups' images together that are associated with the same individual that is tracked across the frames. Thus, for example, where the video shows two individuals moving within the region detected, many face images may be identified by face detection module 152 for each of the individuals. Individual tracking module 154 groups all of the images associated with one of the individuals together in an image event, and groups all of the images associated with the other individual together in another separate image event. By doing this, individual tracking module 154 knows that all of the face images in one image event are the same individual, and all of the images in the other image event are the same individual. As used herein, the phrase "image event" is used in its broadest sense to mean two or more images that are gathered in a common event such that it is known that the images are of the same individual. Such an approach provides for gathering several images of what is known to be the same individual, and thus generating images of different poses, and/or quality.

Each image event is provided to an image quality based image elimination module 156. Image quality based image elimination module 156 is configured to score the face images included in each image event received from individual tracking module 154 to yield quality scores indicative of the quality of the respective face images. Any scoring approach known in the art may be used. Using a user programmable image quality threshold value, image quality based image elimination module 156 eliminates any image in the image event that exhibits a score less than the image quality threshold value. This leaves only images of a certain quality in each processed image event.

Facial feature extraction module 158 is configured to extract facial features from each face image remaining in each image event processed by image quality based image elimination module 156 to yield feature vectors that describe each face included in the received face images. To do so, facial feature extraction module 158 may apply a deep neural network (DNN) algorithm. Such DNN algorithms may include, but are not limited to, FaceNet, and/or ArcFace as are known in the art. Based upon the disclosure provided herein, one of ordinary skill in the art will recognize a variety of DNN algorithms that may be used in relation to different embodiments to yield the feature vectors.

Multiple image event based clustering module 160 is configured to perform an image event based comparison using the facial feature vectors extracted by facial feature extraction module 158 with facial feature vectors extracted from previously processed and stored image events to identify image events that are sufficiently similar to justify considering that the image events correspond to the same individual. The identified image events corresponding to the same individual are clustered together as a sub-cluster associated with the common individual. A sub-cluster may include two or more image events.

A sub-cluster fine tuning module 162 is configured to use non-image based analysis to combine two or more sub-clusters into a cluster. As used herein, the phrase "non-image based analysis" is any analysis that is not automatically generated based upon one or more images included in sub-clusters. As an example, a non-image based analysis may include receiving an input from a human indicating that two sub-clusters include images of the same individual. As another example, a non-image based analysis may include matching an RFID reader input gathered at the same time an image event that indicates the presence of the same individual included in two different sub-clusters in the field of view of a camera. Based upon the disclosure provided herein, one of ordinary skill in the art will recognize a variety of non-image based analysis that may be used in relation to different embodiments.

As those skilled in the art will appreciate, while face recognition system 104 is described in the context of human face recognition, the methodologies described herein may be useful to object recognition more generally. As such, an object recognition system can similarly be designed with an object quality prediction module and an object feature extraction module, and both configured to use a common DNN backbone. For example, the DNN may be trained to recognize a specific object type; and instead of predicting a score for suitability for facial detection, which looks for a face, the object quality prediction module can be trained to output a score indicative of the quality of an image at issue for extracting features associated with the object type at issue. Similarly, the object feature extraction module may be trained for extracting features specific to the particular object type. Depending upon the particular implementation, face recognition system 104 may use local compute and/or storage resource or cloud resources for predicting facial quality and extracting facial features using DNN.

Figure 1B:
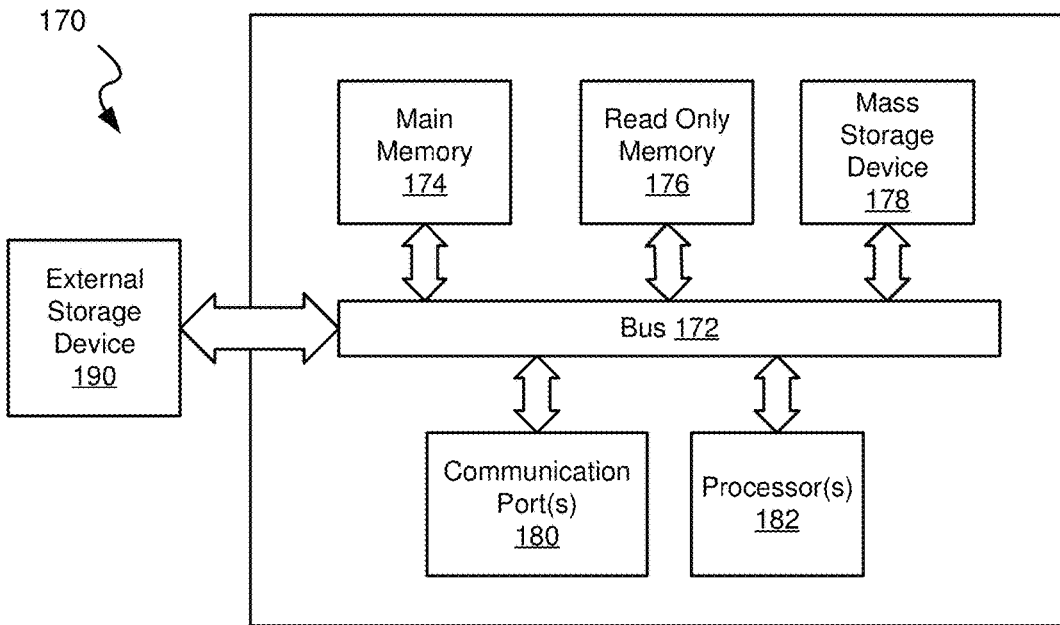
FIG. 1B illustrates an example computer system in which or with which embodiments of the present disclosure may be utilized.

Turning to FIG. 1B, an example computer system 170 is shown in which or with which embodiments of the present disclosure may be utilized. As shown in FIG. 1B, computer system 170 includes an external storage device 190, a bus 172, a main memory 174, a read-only memory 176, a mass storage device 178, one or more communication ports 1010, and one or more processing resources (e.g., processors 182). In one embodiment, computer system 100 may represent some portion of a camera (e.g., camera 116a-n), a surveillance system (e.g., surveillance system 102), or a face recognition system (e.g., face recognition system 104).

Those skilled in the art will appreciate that computer system 100 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
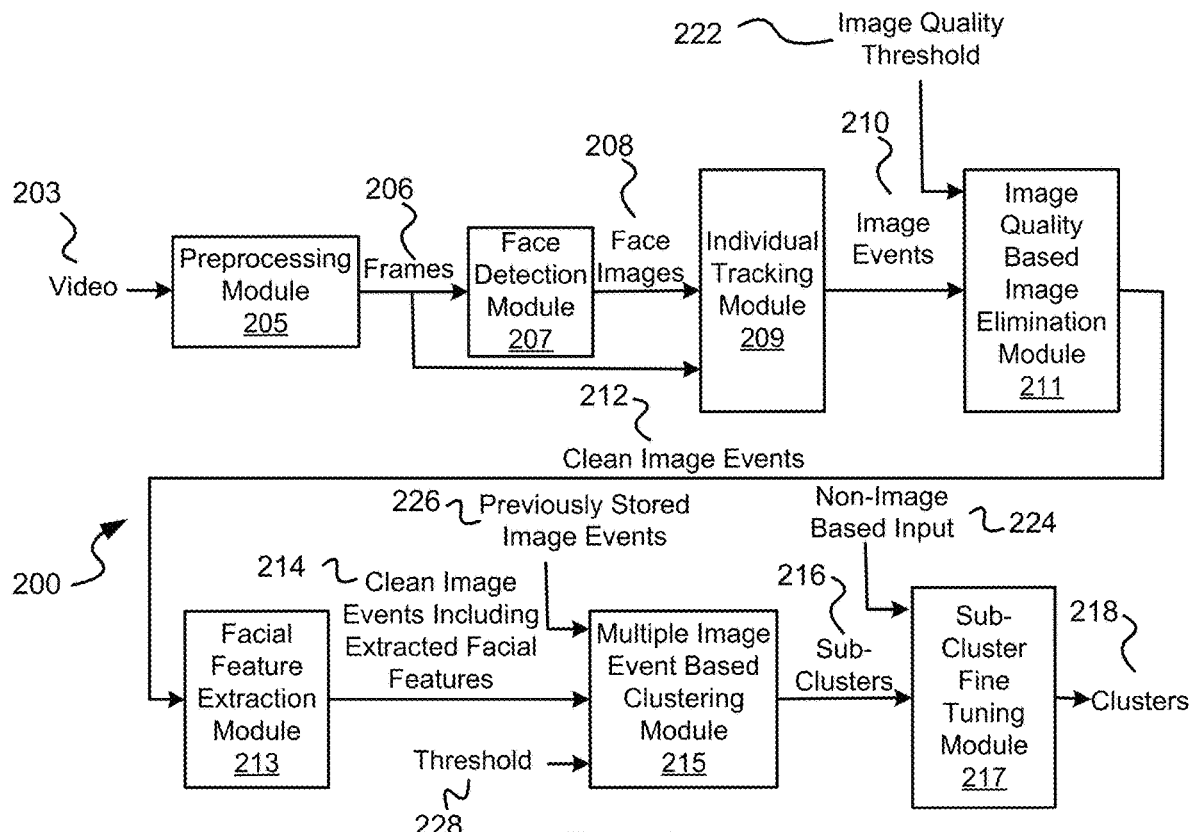
FIG. 2 depicts a facial recognition system including gathering image events together into sub-clusters, and gathering sub-clusters together into clusters in accordance with various embodiments.

Turning to FIG. 2, a facial recognition system 200 is shown that includes gathering image events together into sub-clusters, and gathering sub-clusters together into clusters in accordance with various embodiments. Facial recognition system 200 includes a preprocessing module 205 that is configured to receive a video input 203 (or a series of still images) from, for example, one of cameras 116, and to extract image frames from the video input. In addition, preprocessing module 205 is configured to apply one or more image processing operations to the extracted frame (or received still image) to enhance the image for facial recognition. Video may be received from any of a number of devices and/or locations. For example, in some cases video may be received from cameras (e.g., cameras 116), or may be provided by a requester via the Internet. Based upon the disclosure provided herein, one of ordinary skill in the art will recognize a variety of sources from which video may be received and/or mechanisms by which the images may be received.

Such image preprocessing operations performed by preprocessing module 205 may include, but are not limited to, whitening, scaling, and/or de-blurring as are known in the art. Based upon the disclosure provided herein, one of ordinary skill in the art will recognize a variety of image processing operations and/or various known processes for segregating a video into a sequence of frames that may be used in relation to different embodiments. Preprocessing module 205 provides separated and preprocessed image frames 206 to a face detection module 207.

Face detection module 207 is configured to apply one or more face recognition algorithms to the scene within each of the series of frames 206 received from preprocessing module 205. Application of the face recognition algorithm(s) yields face images 208 from each of frames 206 (any number of face images can be derived from each frame 206 depending in part upon the number of individuals within the field of view of the camera from which video 203 was collected). Such face recognition algorithms may include, but are not limited to, Multi-Task Cascaded Convolutional Neural Networks (MTCNN) and/or TinaFace as are known in the art. Based upon the disclosure provided herein, one of ordinary skill in the art will recognize a variety of face recognition algorithms that may be applied yield the face image(s). The resulting face images 208 are provided to an individual tracking module 209.

Figure 3A:
FIGS. 3A-3C are graphical representations of image processing in accordance with some embodiments.

Turning to FIG. 3A, a graphical representation 300 shows an example of face images (i.e., face images 301, 302, 303, 304, 305, 306, 307, 308, 309, 310, 311, 312, 313, 314, 315, 316, 317, 318, 319, 320, 321, 322, 323, 324, 325, 326, 327, 328, 329, and 330) that have been captured from a sequence of video image frames. The individuals (e.g., in this example, person A, person B, and person C) within the received video often appear across a number of sequential frames as they move through the field of view of a camera that captured the received video. As shown in the example, face images are captured of the three individuals from the processed frames. As face images of all three individuals are not available in every frame because the individual may not be facing the camera or may have moved in or out of the field of view of the camera during the period represented by the frames of video that are being processed, it is possible that a different number of face images are captured for one individual than for another individual. In this case, there are: twelve (12) images for person A (i.e., face images 301, 302, 308, 309, 310, 312, 318, 319, 321, 326, and 328), ten (10) images for person B (i.e., face images 303, 305, 306, 307, 313, 316, 317, 320, 327, and 329), and eight (8) images for person C (i.e., face images 304, 311, 314, 315, 322, 323, 324, and 330).

In each frame, the face capture processing may capture another face image for the individual within the received video. As the face images are captured they are associated with the individual from which they were derived. Using the example of FIG. 3A, the association is done by labeling an image with person A, person B, or person C depending upon the particular individual from which the face image was taken. As such, a number of face images captured across a sequence of frames that are associated with the same individual can be grouped together in an image event. As described above, an image event includes a number of face images that are known to be of the same individual. As the face images in the image event are taken from different frames, they may show the individual's face in different poses, different lighting, and/or different image quality.

Returning to FIG. 2, individual tracking module 209 is configured to track individuals across frames 206 in which face images 208 are detected. As face images 208 are detected by face detection module 207, individual tracking module 209 groups images together that are associated with the same individual that it tracked across the frames. Thus, for example, where video 203 shows two individuals moving within the field of view of the camera which provided the video, many face images 208 may be identified by face detection module 207 for each of the individuals. Individual tracking module 209 groups all of the face images 208 associated with one of the individuals together in an image event, and groups all of the face images 208 associated with the other individual together in another separate image event. By doing this, individual tracking module 209 knows that all of the face images in one image event are the same individual, and all of the images in the other image event are the same individual. Such an approach provides for gathering several images of what is known to be the same individual, and thus generating images of different poses, and/or quality. Individual tracking module 209 provides the resulting image events 210 to an image quality based image elimination module 211.

Figure 3B:
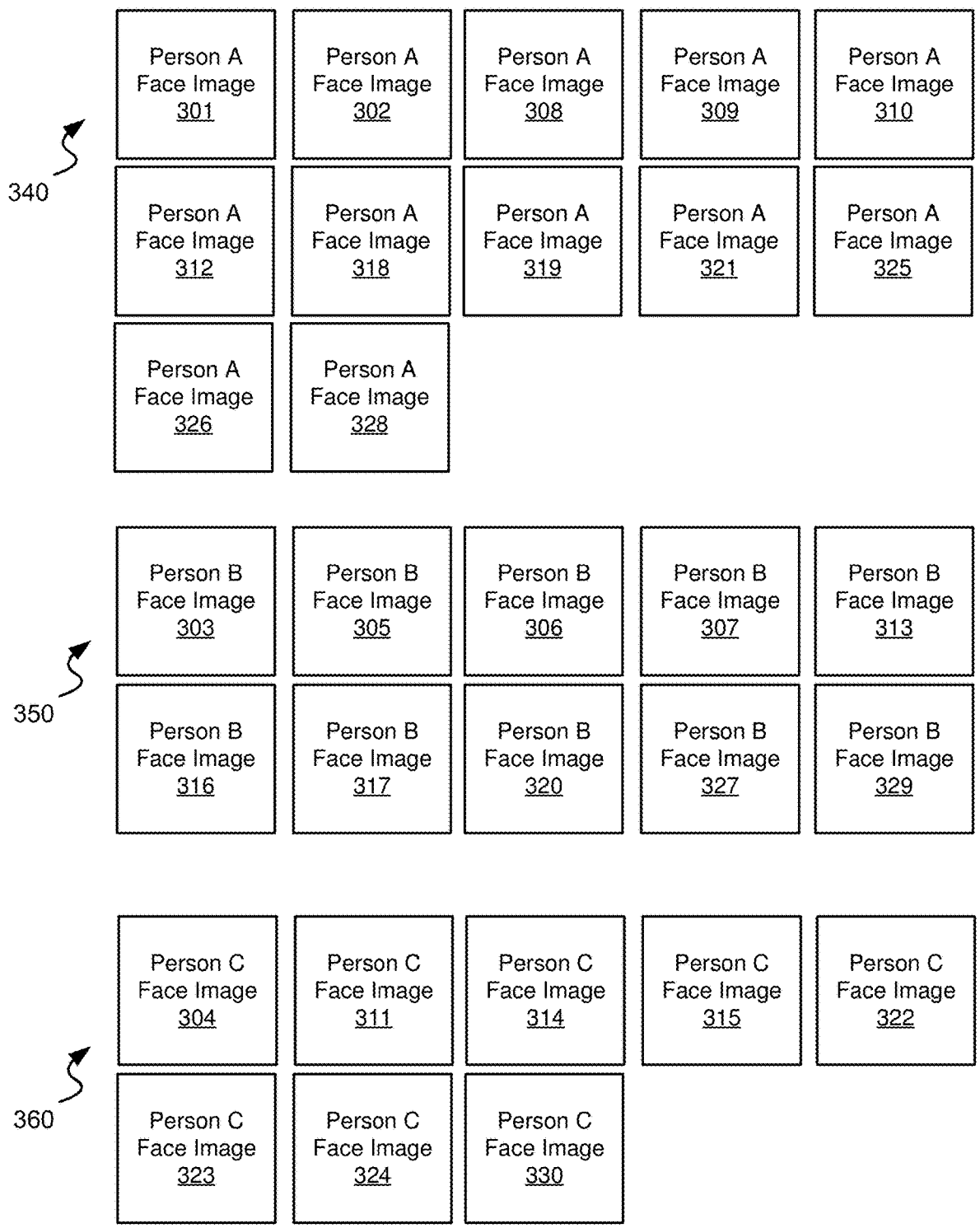

Turning to FIG. 3B, the process of grouping into image events and storing the image events is shown using the images of the example of FIG. 3A. In particular, the images are grouped into image events 340, 350, 360. Image event 340 includes the twelve (12) images for person A (i.e., face images 301, 302, 308, 309, 310, 312, 318, 319, 321, 326, and 328). Image event 350 includes the ten (10) images for person B (i.e., face images 303, 305, 306, 307, 313, 316, 317, 320, 327, and 329). Image event 360 includes the eight (8) images for person C (i.e., face images 304, 311, 314, 315, 322, 323, 324, and 330).

Image quality based selection module 211 is configured to score face images 208 included in each image event 210 received from individual tracking module 209 to yield quality scores indicative of the quality of the respective face images 208. Any scoring approach known in the art may be used. Any scoring approach known in the art may be used. As some examples, commercially available FaceQNet™ and/or HopeNet™ may be used in relation to some embodiments. As another example, the scoring methods described in U.S. patent application Ser. No. 17/135,867 entitled "JOINT FACIAL FEATURE EXTRACTION AND FACIAL IMAGE QUALITY ESTIMATION USING A DEEP NEURAL NETWORK (DNN) TRAINED WITH A CUSTOM-LABELED TRAINING DATASET AND HAVING A COMMON DNN BACKBONE", and filed Dec. 28, 2020 by Dong may be used in accordance with some embodiments. The entirety of the aforementioned reference is incorporated herein by reference for all purposes.

Using a user programmable image quality threshold value 222, image quality based image elimination module 211 eliminates any image 208 in an image event 210 that exhibits a score less than image quality threshold value 222. This leaves only images of a certain quality in each processed image event. Such processed image events are referred to as clean image events 212 and are provided to a facial extraction module 213.

Figure 3C:
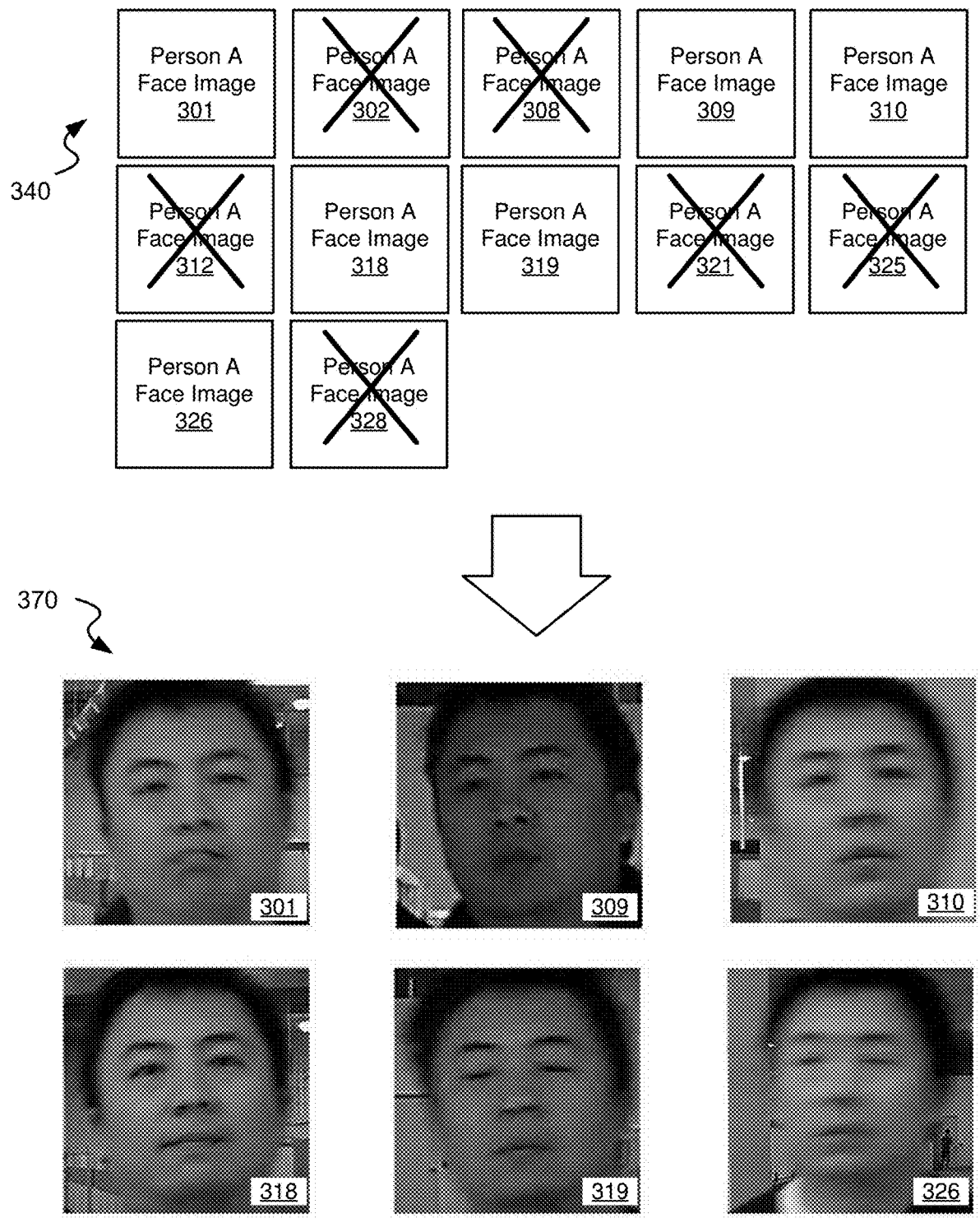

Turning to FIG. 3C, the example discussed above in relation to FIGS. 3A-3B is continued for image event 340 including images of person A. Images that are marked out by an "X" (i.e., face images 302, 308, 312, 321, 325, and 328) are those that were found to have a quality score below the threshold are thus being removed from image event 340. The other images (i.e., face images 301, 309, 310, 318, 319, and 326) are kept in image event 340. An example image event 370 are shown that include example face images 301, 309, 310, 318, 319, and 326 that are kept in image event 340 after the quality control processing.

Facial extraction module 213 is configured to extract facial features from each face image 208 remaining in each clean image event 212 to yield feature vectors that describe each face included in the received face images. To do so, facial feature extraction module 213 may apply a deep neural network (DNN) algorithm. Such DNN algorithms may include, but are not limited to, FaceNet™ or ArcFace™ as are known in the art. Based upon the disclosure provided herein, one of ordinary skill in the art will recognize other facial feature extraction approaches that may be used in relation to different embodiments. Facial feature extraction module 213 provides the clean image event augmented with the extracted facial features 214 to a multiple image event based clustering module 215.

Multiple image event based clustering module 215 is configured to perform an image event based comparison using the facial feature vectors extracted by facial feature extraction module 213 with facial feature vectors extracted from previously stored image events 226 to identify image events that are sufficiently similar to clean image event 214 to justify considering that the image events correspond to the same individual. Determination of a match between two image events begins by calculating a sequence distance metric (i.e., d) between two image events (i.e., clean image event 214 and one of previously stored image events 226) in accordance with the following equation:

$$d_{aver} = \frac{1}{mn} \sum_{i,j} d(x_i, y_j)$$

over the facial features in two image events X and Y, where $X=[x_1, x_2, \ldots x_m]$ and $Y=[y_1, y_2, \ldots x_n]$. Thus, in this case the distance metric, $d_{aver}$, is the average of the distance between each element of the new image event (i.e., image event X) and each element of a previously stored image event (i.e., image event Y). Using sequence distance metric instead of individual distance metric is a kind of "image diversity", which could significantly mitigate the effect of image quality variance, headpose variance etc., and thus provide more robust clustering results.

While the aforementioned calculates an average distance for the distance metric, other embodiments may calculate a minimum distance in accordance with the following equation:

$$d_{min} = \min_{i,j} d(x_i, y_j)$$

over the facial features in two image events X and Y, where $X=[x_1, x_2, \ldots x_m]$ and $Y=[y_1, y_2, \ldots x_n]$. Thus, in this case the distance metric, $d_{min}$, is the minimum distance between any element of the new image event (i.e., image event X) and any element of a previously stored image event (i.e., image event Y). The aforementioned minimum distance and average distance metrics may be referred to herein generically as composite distances which may also refer to any distance metric calculated or determined based upon two or more distances (e.g., d(x, y)).

Where the calculated distance metric (e.g., either $d_{aver}$ or $d_{min}$) is less than a programmable threshold value 228, multiple image event based clustering module 215 identifies clean image event 214 as a match to the particular one of the previously stored image events 226. This process is repeated for all of previously stored image events 226. In some embodiments, the programmable threshold value 228 is selected to be sufficiently low that only a small percentage of mismatches are identified as matches. This is to assure a high degree of purity in any combination of image events into sub-clusters. In some cases, by using a low value for the programmable threshold value all of the image events including images of a particular individual will not be identified as matches. Because of this, there may be a number of sub-clusters of image events that are not combined into a single sub-cluster. Thus, at this level of processing the tradeoff between purity of sub-clusters (i.e., a high degree of likelihood that all face images in a sub-cluster are of the same individual) and completeness of sub-clusters (i.e., a high degree of likelihood that all face images for a particular individual are included into a single sub-cluster) is heavily skewed toward obtaining purity of sub-clusters. Because of this, there may be a number of sub-clusters of image events that are not combined into a single sub-cluster.

Multiple image event based clustering module 215 groups clean image event 214 into a sub-cluster 216 that includes all previously stored image events 226 that were found to match (i.e., were determined to include face images 208 of the same individual). Each sub-cluster 216 may include two or more image events. Resulting sub-clusters 216 for each individual are provided to a sub-cluster fine tuning module 217. Multiple image event based clustering module 215 performs this same process on all clean image events 214 received from facial feature extraction module 213.

Figure 4:
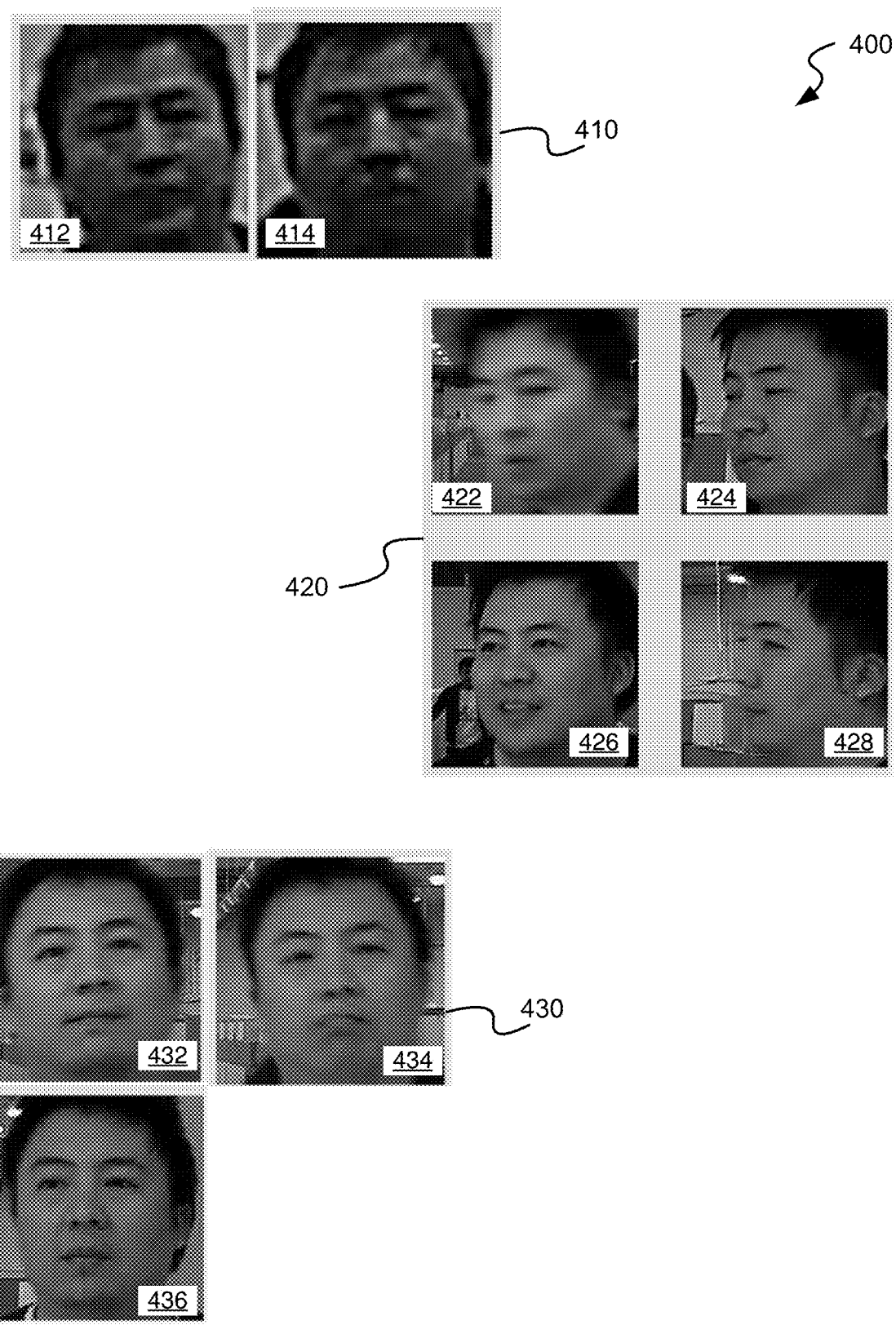
FIG. 4 is an example of sub-clusters including images of the same individual that may occur in relation to some embodiments.

Turning to FIG. 4, an example of three distinct sub-clusters 410, 420, 430 are shown that each include face images of the same individual, but because of a low value for the programmable threshold value they were not automatically identified as matches to each other and therefore not combined into the same sub-cluster. As shown, each face image shown (i.e., face image 412, 414, 422, 424, 426, 428, 432, 434, 436) represents a number of images grouped into an image event (similar to image event 370 of FIG. 3C where face images 301, 309, 310, 318, 319, and 326 each represents a single face image). As described above, the value of the programmable threshold value could be increased such that sub-clusters 410, 420, 430 would be identified as matches and thereby combined into a common sub-cluster, but doing so would reduce the likelihood that any of sub-clusters 410, 420, 430 may become impure and/or the sub-cluster resulting from combining the sub-cluster would be impure. As stated above, at this level of processing, the tradeoff between purity and completeness is skewed toward purity.

Returning to FIG. 2, to address the incompleteness resulting from use of a low value for programmable threshold value 228, sub-cluster fine tuning module 217 is configured to apply non-image based analysis to group multiple sub-clusters 216 that include image events corresponding to the same individual into a common cluster having the face images for a particular individual.

In some embodiments, the non-image based input 224 is an input from a human indicating that two sub-clusters 216 include face images 208 of the same individual. In such a case, sub-cluster fine tuning module 217 combines the two sub-clusters 216 into a common cluster 218 based upon the received input. In other embodiments, the non-image based input 224 is from RFID readers within the field of view of cameras gathering video 203 from which face images 208 in respective sub-clusters 216 were derived. Such an RFID input indicates the identity of the individual in the face images 208 and where the same individual is identified in relation to image events in two different sub-clusters 216, sub-cluster fine tuning module 217 combines the two sub-clusters 216 into a common cluster 218 based upon the received input. Based upon the disclosure provided herein, one of ordinary skill in the art will recognize other non-image based analysis that may be used to justify combining two or more sub-clusters. It has been found that in some cases, limited non-image based input is necessary to obtain satisfactory results. For example, in some cases, after four (4) to five (5) combinations of sub-clusters, the clustering result shall be both pure and complete. Moreover, most new incoming facial images are "attracted" to the right clusters because, fundamentally, the clustering/combining process is also a process of consolidation of the training model.

As can be appreciated from the discussion of facial recognition system 200, a three tier hierarchy of image processing is applied to properly group face images 208 received in relation to common individuals. In the first process, individual tracking module 209 tracks individuals across frames 206 such that multiple face images 208 gathered from a sequence of multiple frames 206 of video 203 can be grouped together into image events 210. In the next level of the hierarchy, multiple image event based clustering module 215 groups a newly received image event 214 with one or more previously processed image events 226 and/or sub-clusters of image events based upon similarity between facial features in the two groups of face images. This level of the hierarchy uses a matching criteria that is skewed toward assuring purity of any sub-cluster of image events. In the next level of the hierarchy, sub-cluster fine tuning module 217 applies non-image based analysis across sub-clusters of image events to group sub-clusters where they are of the same individual. This process operates to alleviate a degree of incompleteness introduced by the restrictive matching criteria used in the prior level of the hierarchy.

Figure 5:
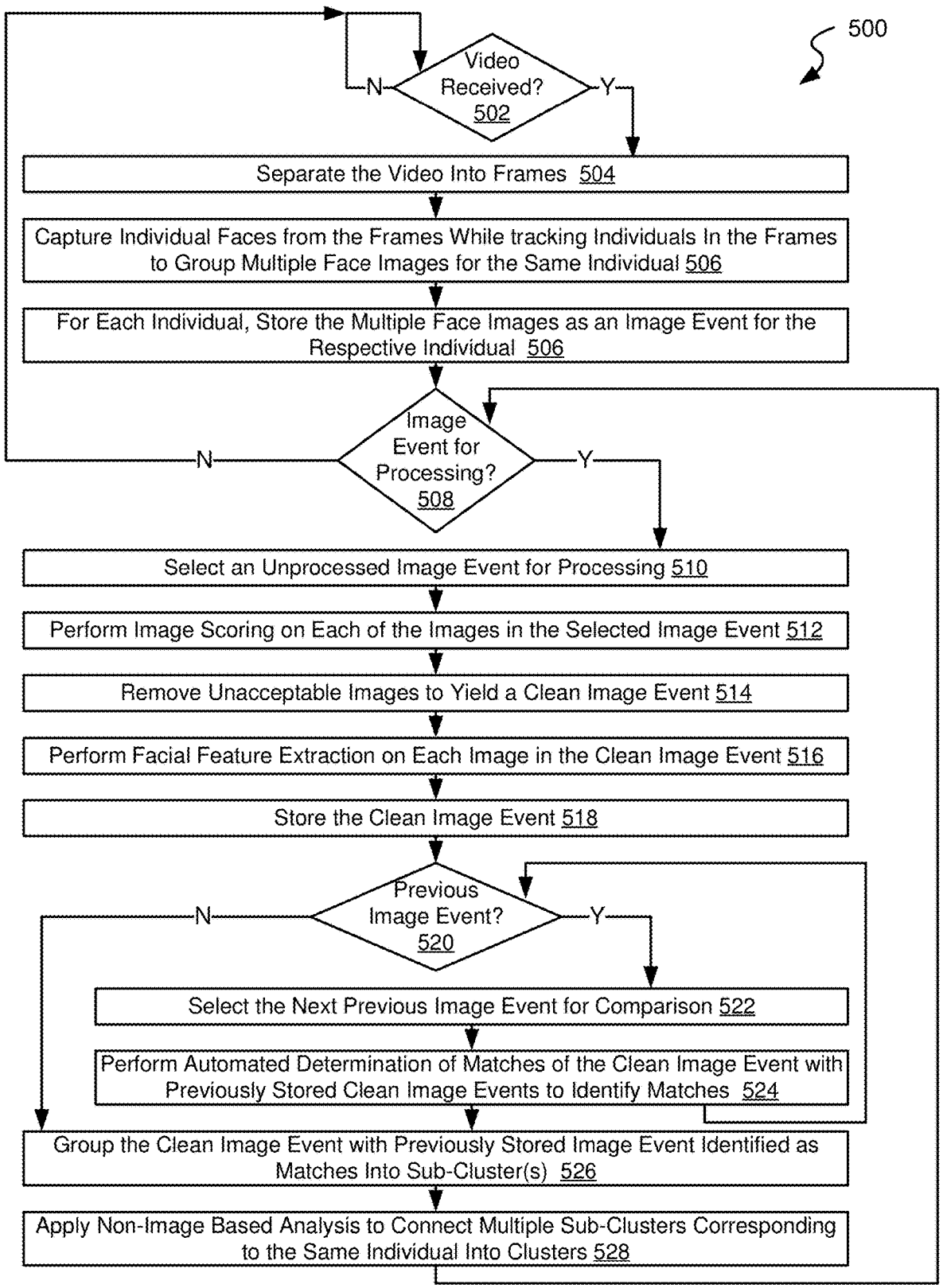
FIG. 5 is a flow diagram showing a method in accordance with some embodiments for gathering image events together into sub-clusters, and gathering sub-clusters together into clusters in accordance with various embodiments.

Turning to FIG. 5, a flow diagram 500 shows a method in accordance with some embodiments for gathering image events together into sub-clusters, and gathering sub-clusters together into clusters in accordance with various embodiments. Following flow diagram 500, it is determined if a video has been received (block 502). Video may be received from any of a number of devices and/or locations. For example, in some cases video may be received from cameras (e.g., cameras 116), or may be provided by a requester via the Internet. Based upon the disclosure provided herein, one of ordinary skill in the art will recognize a variety of sources from which video may be received and/or mechanisms by which the images may be received.

Where video has been received (block 502), the video is separated into individual frames (block 504). Such separation into individual frames may be done using any approach known in the art for doing so. Facial image capture is applied to individual frames of the received video (block 506). Each frame may include any number of individuals, and the facial image capture is configured to capture images of the faces of all individuals within the frame. As such, the facial image capture can yield any number of face images from a single frame. Such facial image capture may be done using any approach known in the art for identifying faces within an image.

Turning to FIG. 3A, a graphical representation 300 shows an example of face images (i.e., face images 301, 302, 303, 304, 305, 306, 307, 308, 309, 310, 311, 312, 313, 314, 315, 316, 317, 318, 319, 320, 321, 322, 323, 324, 325, 326, 327, 328, 329, and 330) that have been captured from a sequence of video image frames. The individuals (e.g., in this example, person A, person B, and person C) within the received video are often appear across a number of sequential frames as they move through the field of view of a camera that captured the received video. As shown in the example, face images are captured of the three individuals from the processed frames. As face images of all three individuals are not available in every frame because the individual may not be facing the camera or may have moved in or out of the field of view of the camera during the period represented by the frames of video that are being processed, it is possible that a different number of face images are captured for one individual than for another individual. In this case, there are: twelve (12) images for person A (i.e., face images 301, 302, 308, 309, 310, 312, 318, 319, 321, 326, and 328), ten (10) images for person B (i.e., face images 303, 305, 306, 307, 313, 316, 317, 320, 327, and 329), and eight (8) images for person C (i.e., face images 304, 311, 314, 315, 322, 323, 324, and 330).

In each frame, the face capture processing may capture another face image for the individual within the received video. As the face images are captured they are associated with the individual from which they were derived. Using the example of FIG. 3A, the association is done by labeling an image with person A, person B, or person C depending upon the particular individual from which the face image was taken. As such, a number of face images captured across a sequence of frames that are associated with the same individual can be grouped together in an image event. As described above, an image event includes a number of face images that are known to be of the same individual. As the face images in the image event are taken from different frames, they may show the individual's face in different poses, different lighting, and/or different image quality.

Returning to FIG. 5, for each individual across the frames of video, store one or more face images that were captured from the received video as an image event for each of the individuals (block 506). Turning to FIG. 3B, the process of grouping into image events and storing the image events is shown using the images of the example of FIG. 3A. In particular, the images are grouped into image events 340, 350, 360. Image event 340 includes the twelve (12) images for person A (i.e., face images 301, 302, 308, 309, 310, 312, 318, 319, 321, 326, and 328). Image event 350 includes the ten (10) images for person B (i.e., face images 303, 305, 306, 307, 313, 316, 317, 320, 327, and 329). Image event 360 includes the eight (8) images for person C (i.e., face images 304, 311, 314, 315, 322, 323, 324, and 330).

Returning to FIG. 5, it is determined whether a new image event is available for processing (block 508). Thus, using the example of FIG. 3B, three image events would be available for processing as they have just been received and have not yet been processed. Where an image event is available for processing (block 508), one of the available image events is selected for processing (block 510).

Each of the images in the selected image event are accessed and scored for quality (block 512). Any scoring approach known in the art may be used. As some examples, commercially available FaceQNet™ and/or HopeNet™ may be used in relation to some embodiments. As another example, the scoring methods described in U.S. patent application Ser. No. 17/135,867 entitled "JOINT FACIAL FEATURE EXTRACTION AND FACIAL IMAGE QUALITY ESTIMATION USING A DEEP NEURAL NETWORK (DNN) TRAINED WITH A CUSTOM-LABELED TRAINING DATASET AND HAVING A COMMON DNN BACKBONE", and filed Dec. 28, 2020 by Dong may be used in accordance with some embodiments. The entirety of the aforementioned reference was previously incorporated herein by reference for all purposes.

A quality threshold is then applied to each of the images in the selected image event to determine if the quality is sufficiently high to keep the image, and images of insufficient quality are eliminated from the selected image event (block 514). In some cases, this may done by a quality thresholding module that compares the generated quality scores with a quality threshold value to determine whether to keep or discard the particular image. Where a quality score is too low, the image is removed from the image event. Otherwise, the image is kept as part of the image event.

Turning to FIG. 3C, the example discussed above in relation to FIGS. 3A-3B is continued for image event 340 including images of person A. Images that are marked out by an "X" (i.e., face images 302, 308, 312, 321, 325, and 328) are those that were found to have a quality score below the threshold are thus being removed from image event 340. The other images (i.e., face images 301, 309, 310, 318, 319, and 326) are kept in image event 340. An example image event 370 are shown that include example face images 301, 309, 310, 318, 319, and 326 that are kept in image event 340 after the quality control processing.

Returning to FIG. 5, facial feature extraction is performed on each face image that remains in the selected image event (block 516). Any type of facial feature extraction processing known in the art may be applied to a received image to yield feature vectors corresponding to faces in the image. For example, FaceNet™ or ArcFace™ may be used to perform the facial feature extraction. Based upon the disclosure provided herein, one of ordinary skill in the art will recognize other facial feature extraction approaches that may be used in relation to different embodiments. The facial features and the clean image event (i.e., the image event after removal of low quality images) are stored (block 518).

It is determined whether a previously stored image event remains to be compared with the newly received clean image event (block 520). In some cases there may be many previously stored image events that include images of the same individual as the newly received clean image event. In some cases, the previously stored image events may have already been grouped into sub-clusters of image events that include face images of the same individual. In cases where a previously stored image event has been grouped into a sub-cluster, all images in the sub-cluster are considered to be a single image event for the purposes of matching to the newly received clean image event.

Where another previously stored image event remains to be compared with the newly received clean image event (block 520), the first/next previously stored image event is selected (block 522) and an automated determination of matches of the newly received clean image event is compared with the selected previously stored image event is performed (block 524). Determination of a match between the newly received clean image event and the selected previously stored image event begins by calculating a sequence distance metric (i.e., d) between two image events in accordance with the following equation:

$$d_{aver} = \frac{1}{mn}\sum_{i,j}d(x_i, y_j)$$

over the facial features in two image events X and Y, where $X=[x_1, x_2, \ldots x_m]$ and $Y=[y_1, y_2, \ldots x_n]$. Thus, in this case the distance metric, $d_{aver}$, is the average of the distance between each element of the new image event (i.e., image event X) and each element of a previously stored image event (i.e., image event Y).

While the aforementioned calculates an average distance for the distance metric, other embodiments may calculate a minimum distance in accordance with the following equation:

$$d_{min} = \min_{i,j}d(x_i, y_j)$$

over the facial features in two image events X and Y, where $X=[x_1, x_2, \ldots x_m]$ and $Y=[y_1, y_2, \ldots x_n]$. Thus, in this case the distance metric, $d_{min}$, is the minimum distance between any element of the new image event (i.e., image event X) and any element of a previously stored image event (i.e., image event Y).

Where the calculated distance metric (e.g., either $d_{aver}$ or $d_{min}$) is less than a programmable threshold value, the newly received clean image event is identified as a match to the selected previously stored image event. In some embodiments, the programmable threshold value is selected to be sufficiently low that only a small percentage of mismatches are identified as matches. This is to assure a high degree of purity in any combination of image events into sub-clusters. In some cases, by using a low value for the programmable threshold value all of the image events including images of a particular individual will not be identified as matches. Because of this, there may be a number of sub-clusters of image events that are not combined into a single sub-cluster. Thus, at this level of processing the tradeoff between purity of sub-clusters (i.e., a high degree of likelihood that all face images in a sub-cluster are of the same individual) and completeness of sub-clusters (i.e., a high degree of likelihood that all face images for a particular individual are included into a single sub-cluster) is heavily skewed toward obtaining purity of sub-clusters. Because of this, there may be a number of sub-clusters of image events that are not combined into a single sub-cluster.

Turning to FIG. 4, an example of three distinct sub-clusters 410, 420, 430 are shown that each include face images of the same individual, but because of a low value for the programmable threshold value they were not automatically identified as matches to each other and therefore not combined into the same sub-cluster. As shown, each face image shown (i.e., face image 412, 414, 422, 424, 426, 428, 432, 434, 436) represents a number of images grouped into an image event (similar to image event 370 of FIG. 3C where face images 301, 309, 310, 318, 319, and 326 each represents a single face image). As described above, the value of the programmable threshold value could be increased such that sub-clusters 410, 420, 430 would be identified as matches and thereby combined into a common sub-cluster, but doing so would reduce the likelihood that any of sub-clusters 410, 420, 430 may become impure and/or the sub-cluster resulting from combining the sub-cluster would be impure. As stated above, at this level of processing, the tradeoff between purity and completeness is skewed toward purity.

Returning to FIG. 5, it is determined whether one or more previously stored image events remain to be compared with the newly received clean image event (block 520). Where another remains (block 520), the processes of blocks 522-524 are repeated for the next previously stored image event. Alternatively, where no additional previously stored image events remain to be compared with the newly received clean image event (block 520), all of the image events that were found to match the newly received clean image event are grouped into a common sub-cluster (block 526).

To address the incompleteness resulting from use of a low value for the programmable threshold value in block 524, non-image based analysis is applied to group multiple sub-clusters including image events corresponding to the same individual into a common cluster having the face images for a particular individual (block 528). In some embodiments, the non-image based analysis includes receiving an input from a human indicating that two sub-clusters include images of the same individual and combining the two-sub-clusters into a common cluster based on the received input. In other embodiments, the non-image based analysis includes matching an RFID reader input gathered at the same time as respective image events within two separate sub-clusters that indicates the presence of the same individual included in two different sub-clusters in the field of view of a camera. Where the RFID information indicates that one or more image events in the separate sub-clusters are of the same individual, the sub-clusters are combined into a common cluster. Based upon the disclosure provided herein, one of ordinary skill in the art will recognize other non-image based analysis that may be used to justify combining two or more sub-clusters.

It is then determined whether additional newly received image events remain for processing (block 508). Where additional image events remain for processing (block 508), the processes of blocks 510-528 are repeated for the next of the newly received image events. Otherwise, where no additional image events remain for processing (block 508), additional video is awaited (block 502).

As can be appreciated from the description provided above in relation to FIG. 5, a three tier hierarchy of image processing is applied to properly group images received in relation to common individuals. In the first process, individuals are tracked such that multiple face images gathered from a sequence of multiple frames of video can be grouped together into image events. In the next level of the hierarchy, a newly received image event is grouped with previously processed image events and/or sub-clusters of image events based upon similarity between facial features in the two groups of face images. This level of the hierarchy uses a matching criteria that is skewed toward assuring purity of any sub-cluster of image events. In the next level of the hierarchy, non-image based analysis is applied across sub-clusters of image events to group sub-clusters where they are of the same individual. This process operates to alleviate a degree of incompleteness introduced by the restrictive matching criteria used in the prior level of the hierarchy.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the example hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

What is claimed is:

1. A facial recognition system, the system comprising:
a processing resource;
a non-transitory computer-readable medium, having stored therein instructions that when executed by the processing resource cause the processing resource to:
receive a series of scene images;
assemble a first image event including at least a first face image from a first scene image of the series of scene images and a second face image from a second scene image of the series of scene images;
perform facial feature extraction on at least the first face image to yield a first facial feature, and on the second face image to yield a second facial feature;
calculate:
a first distance between the first facial feature and a third facial feature corresponding to a third face image in a second image event;
a second distance between the first facial feature and a fourth facial feature corresponding to a fourth face image in the second image event;
a third distance between the second facial feature and the third facial feature corresponding to the third face image in the second image event;
a fourth distance between the second facial feature and the fourth facial feature corresponding to the fourth face image in the second image event;
determine a composite distance between the first image event and the second image event based at least in part on a combination of the first distance, the second distance, the third distance, and the fourth distance; and
group the first image event with the second image event based at least in part on the composite distance.

2. A non-transitory computer-readable storage medium embodying a set of instructions, which when executed by one or more processing resources of a computer system, causes the one or more processing resources to:
receive a series of scene images, wherein the series of scene images includes at least a first scene image taken at a location at a first time and a second scene image taken at the location at a second time;
assemble a first image event including at least a first face image from the first scene image and a second face image from the second scene image;
perform facial feature extraction on at least the first face image to yield a first facial feature, and on the second face image to yield a second facial feature;
calculate:
a first distance between the first facial feature and a third facial feature corresponding to a third face image in a second image event;
a second distance between the first facial feature and a fourth facial feature corresponding to a fourth face image in the second image event;
a third distance between the second facial feature and the third facial feature corresponding to the third face image in the second image event;

a fourth distance between the second facial feature and the fourth facial feature corresponding to the fourth face image in the second image event;

determine a composite distance between the first image event and the second image event based at least in part on a combination of the first distance, the second distance, the third distance, and the fourth distance; and group the first image event with the second image event based at least in part on the composite distance.

3. The non-transitory computer readable medium of claim 2, wherein the instructions of the set of instructions that cause the one or more processing resources to determine the composite distance between the first image event and the second image event based at least in part on the combination of the first distance, the second distance, the third distance, and the fourth distance includes instructions that cause the one or more processing resources to:

calculate an average distance between the first image event and the second image event to yield the composite distance.

4. The non-transitory computer readable medium of claim 2, wherein the instructions of the set of instructions that cause the one or more processing resources to determine the composite distance between the first image event and the second image event based at least in part on the combination of the first distance, the second distance, the third distance, and the fourth distance includes instructions that cause the one or more processing resources to:

identify a minimum distance between the first image event and the second image event to yield the composite distance, wherein the minimum distance is one of the first distance, the second distance, the third distance, or the fourth distance.

5. The non-transitory computer readable medium of claim 2, wherein the series of scene images further includes a third scene image taken at the location at a third time, wherein assembling the first image event further includes including a third face image from the third scene image into the first image event, and wherein the set of instructions, which when executed by one or more processing resources of a computer system, causes the one or more processing resources further to:

determine, by the processing device, a first quality score for the first face image;

determine, by the processing device, a second quality score for the second face image;

determine, by the processing device, a third quality score for the third face image, wherein the third quality score indicates the third face image is of lower quality than either the first face image or the second face image; and eliminate the third face image from the first image event based at least in part on the third quality score.

6. The non-transitory computer readable medium of claim 5, wherein the instructions of the set of instructions that cause the one or more processing resources to eliminate the third face image from the first image event based at least in part on the third quality score include instructions that cause the one or more processing resources to:

compare the third quality score with a threshold value, wherein the third quality score is less than the threshold value.

7. The non-transitory computer readable medium of claim 2, wherein the series of scene images is a video, and wherein the set of instructions, which when executed by one or more processing resources of a computer system, causes the one or more processing resources further to:

segregate the video into a series of video frames, wherein the first scene image is a first frame of the series of video frames, and wherein the second scene image is a second frame of the series of video frames.

8. The non-transitory computer readable medium of claim 7, wherein the video is received from a video camera that is incorporated in a surveillance system.

9. The non-transitory computer readable medium of claim 2, wherein the first face image and the third face image are of the same individual.

10. The non-transitory computer readable medium of claim 2, wherein the composite distance is a first composite distance, and wherein the set of instructions, which when executed by one or more processing resources of a computer system, causes the one or more processing resources further to:

assemble a third image event including at least a fifth face image from the first scene image and a sixth face image from the second scene image, wherein the first face image and the second face image are of a first individual; and wherein the fifth face image and the sixth face image are of a second individual;

perform facial feature extraction on at least the fifth face image to yield a fifth facial feature, and on the sixth face image to yield a sixth facial feature;

calculate:

a fifth distance between the fifth facial feature and the third facial feature corresponding to a third face image in the second image event;

a sixth distance between the fifth facial feature and the fourth facial feature corresponding to the fourth face image in the second image event;

a seventh distance between the sixth facial feature and the third facial feature corresponding to the third face image in the second image event;

an eighth distance between the sixth facial feature and the fourth facial feature corresponding to the fourth face image in the second image event; and determine, by the processing resource, a second composite distance between the third image event and the second image event based at least in part on a combination of the fifth distance, the sixth distance, the seventh distance, and the eighth distance.

11. A method for grouping images, the method comprising:

receiving, by a processing resource, a series of scene images, wherein the series of scene images includes at least a first scene image taken at a location at a first time and a second scene image taken at the location at a second time;

assembling, by the processing resource, a first image event including at least a first face image from the first scene image and a second face image from the second scene image;

performing, by the processing resource, facial feature extraction on at least the first face image to yield a first facial feature, and on the second face image to yield a second facial feature;

calculating, by the processing resource:

a first distance between the first facial feature and a third facial feature corresponding to a third face image in a second image event;

a second distance between the first facial feature and a fourth facial feature corresponding to a fourth face image in the second image event;

a third distance between the second facial feature and the third facial feature corresponding to the third face image in the second image event;

a fourth distance between the second facial feature and the fourth facial feature corresponding to the fourth face image in the second image event;

determining, by the processing resource, a composite distance between the first image event and the second image event based at least in part on a combination of the first distance, the second distance, the third distance, and the fourth distance; and grouping, by the processing resource, the first image event with the second image event based at least in part on the composite distance.

12. The method of claim 11, wherein determining the composite distance between the first image event and the second image event based at least in part on the combination of the first distance, the second distance, the third distance, and the fourth distance includes:

calculating, by the processing resource, an average distance between the first image event and the second image event to yield the composite distance.

13. The method of claim 11, wherein determining the composite distance between the first image event and the second image event based at least in part on the combination of the first distance, the second distance, the third distance, and the fourth distance includes:

identifying, by the processing resource, a minimum distance between the first image event and the second image event to yield the composite distance, wherein the minimum distance is one of the first distance, the second distance, the third distance, or the fourth distance.

14. The method of claim 11, wherein the series of scene images further includes a third scene image taken at the location at a third time, wherein assembling the first image event further includes including a third face image from the third scene image into the first image event, the method further comprising:

determining, by the processing device, a first quality score for the first face image;

determining, by the processing device, a second quality score for the second face image;

determining, by the processing device, a third quality score for the third face image, wherein the third quality score indicates the third face image is of lower quality than either the first face image or the second face image; and eliminating the third face image from the first image event based at least in part on the third quality score.

15. The method of claim 14, wherein the eliminating the third face image from the first image event based at least in part on the third quality score includes:

comparing, by the processing resource, the third quality score with a threshold value, wherein the third quality score is less than the threshold value.

16. The method of claim 11, wherein the series of scene images is a video, and wherein the method further comprises:

segregating, by the processing resource, the video into a series of video frames, wherein the first scene image is a first frame of the series of video frames, and wherein the second scene image is a second frame of the series of video frames.

17. The method of claim 16, wherein the video is received from a video camera that is incorporated in a surveillance system.

18. The method of claim 11, wherein the processing resource is incorporated in a surveillance system.

19. The method of claim 11, wherein the first face image and the second face image are of the same individual.

20. The method of claim 19, wherein the first face image and the third face image are of the same individual.

21. The method of claim 11, wherein the composite distance is a first composite distance, the method further comprising:

assembling, by the processing resource, a third image event including at least a fifth face image from the first scene image and a sixth face image from the second scene image, wherein the first face image and the second face image are of a first individual; and wherein the fifth face image and the sixth face image are of a second individual;

performing, by the processing resource, facial feature extraction on at least the fifth face image to yield a fifth facial feature, and on the sixth face image to yield a sixth facial feature;

calculating, by the processing resource:

a fifth distance between the fifth facial feature and the third facial feature corresponding to a third face image in the second image event;

a sixth distance between the fifth facial feature and the fourth facial feature corresponding to the fourth face image in the second image event;

a seventh distance between the sixth facial feature and the third facial feature corresponding to the third face image in the second image event;

an eighth distance between the sixth facial feature and the fourth facial feature corresponding to the fourth face image in the second image event; and determining, by the processing resource, a second composite distance between the third image event and the second image event based at least in part on a combination of the fifth distance, the sixth distance, the seventh distance, and the eighth distance.

* * * * *